US012574107B2

(12) United States Patent
Desai et al.

(10) Patent No.: US 12,574,107 B2
(45) Date of Patent: Mar. 10, 2026

(54) MANAGING A CONNECTION OF A WIRELESS DEVICE TO A SATELLITE NETWORK

(71) Applicant: Skylo Technologies, Inc., Mountain View, CA (US)

(72) Inventors: Soham Dhiren Desai, Palo Alto, CA (US); Meghna Agrawal, Cupertino, CA (US); Ashrith S R, Bangalore (IN); Andrew Nuttall, Mountain View, CA (US)

(73) Assignee: Skylo Technologies, Inc., Mountain View, CA (US)

( * ) Notice: Subject to any disclaimer, the term of this patent is extended or adjusted under 35 U.S.C. 154(b) by 412 days.

(21) Appl. No.: 18/378,804

(22) Filed: Oct. 11, 2023

(65) Prior Publication Data

US 2025/0125867 A1      Apr. 17, 2025

(51) Int. Cl.
*H04B 7/185*          (2006.01)
*H04B 17/391*         (2015.01)
(52) U.S. Cl.
CPC ..... *H04B 7/18558* (2013.01); *H04B 7/18547* (2013.01); *H04B 17/3913* (2015.01)
(58) Field of Classification Search
CPC ............ H04B 7/18558; H04B 17/3913; H04B 7/18547
See application file for complete search history.

(56) References Cited

U.S. PATENT DOCUMENTS

| | | | |
|---|---|---|---|
| 6,408,178 B1 | 6/2002 | Wickstrom | |
| 7,583,225 B2 | 9/2009 | Cohen | |
| 7,751,823 B2 | 7/2010 | Karabinis | |
| 7,974,571 B2 | 7/2011 | Dankberg | |
| 8,385,223 B2 | 2/2013 | Miller | |
| 9,019,960 B2 | 4/2015 | Cheriyath | |
| 9,121,932 B2 | 9/2015 | Janky | |
| 10,425,865 B2 | 9/2019 | Damnjanovic | |
| 2022/0014255 A1* | 1/2022 | Acker | H04B 7/0404 |
| 2022/0045803 A1 | 2/2022 | Lin | |

OTHER PUBLICATIONS

3rd Generation Partnership Project; Technical Specification Group Radio Access Network; Solutions for NR to support non-terrestrial networks (NTN) (Release 16); 3GPP TR 38.821 V16.2.0 (Mar. 2023).

* cited by examiner

*Primary Examiner* — Sulaiman Nooristany
(74) *Attorney, Agent, or Firm* — Brian R. Short

(57) ABSTRACT

Apparatuses, methods, and systems for managing a connection of a wireless device to a satellite network are disclosed. One method includes maintaining, by a core network of the satellite network, a parameter list that includes at least an estimate of a location of the wireless device and an estimate of one or more satellite locations, estimating, by the core network, a probability of a mapping of a wireless connection between the wireless device and a base station supporting the satellite network based upon the parameter list, and initiating, by the core network, a procedure to communicate with the wireless device through the base station based on the estimated probability of the mapping of the wireless connection between the wireless device and the base station.

26 Claims, 9 Drawing Sheets

Maintaining, , by a core network of the satellite network, a parameter list that includes at least an estimate of a location of the wireless device and a location of one or more satellites of the satellite network
310

Estimating, by the core network, a probability of a mapping of a wireless connection between the wireless device and a base station supporting the satellite network based on the parameter list
320

Initiating, by the core network, a procedure to communicate with the wireless device through the base station based on the estimated probability of the mapping of the wireless connection between the wireless device and the base station through the one or more satellites
330

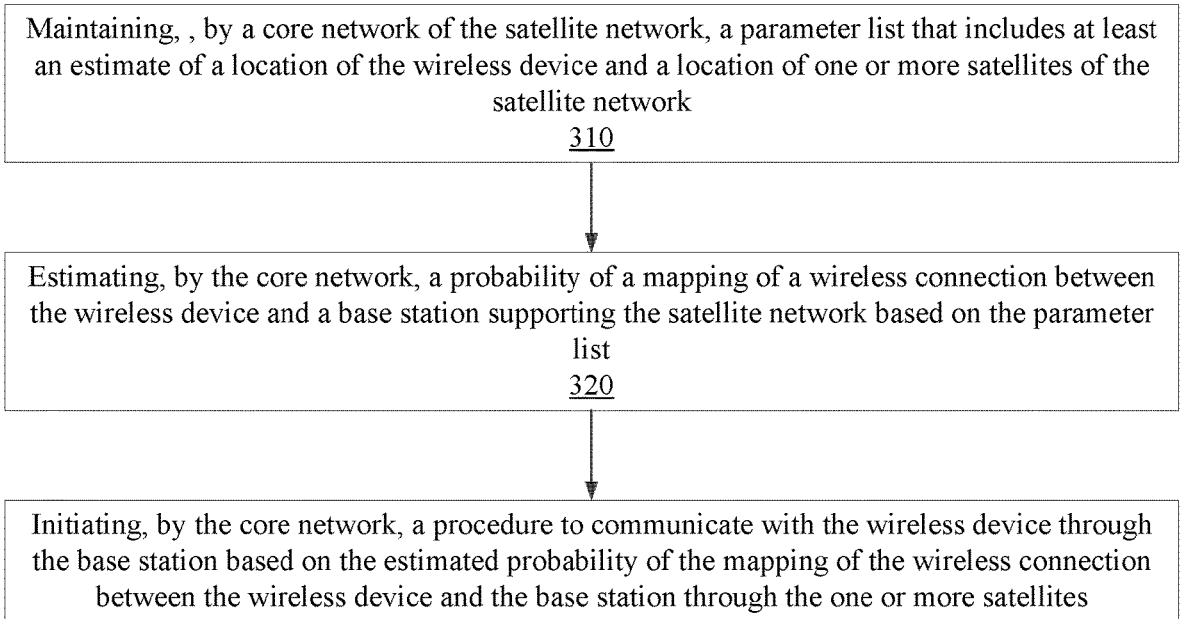

Maintaining, , by a core network of the satellite network, a parameter list that includes at least an estimate of a location of the wireless device and a location of one or more satellites of the satellite network
310

Estimating, by the core network, a probability of a mapping of a wireless connection between the wireless device and a base station supporting the satellite network based on the parameter list
320

Initiating, by the core network, a procedure to communicate with the wireless device through the base station based on the estimated probability of the mapping of the wireless connection between the wireless device and the base station through the one or more satellites
330

Figure 3

Exemplary Network
Parameter List (P1, P2, ...)

MANAGING A CONNECTION OF A WIRELESS DEVICE TO A SATELLITE NETWORK

FIELD OF THE DESCRIBED EMBODIMENTS

The described embodiments relate generally to wireless communications. More particularly, the described embodiments relate to systems, methods, and apparatuses for managing a connection of a wireless device to a satellite network.

BACKGROUND

Satellite networks operate to cover large areas and can have a large number of users. Further, only limited amounts of spectral resources are allocated to satellite networks. Accordingly, satellite networks should manage connectivity of wireless devices to the satellite networks.

It is desirable to have methods, apparatuses, and systems for managing a connection of a wireless device to a satellite network.

SUMMARY

An embodiment includes a method for managing a connection of a wireless device to a satellite network. The method includes maintaining, by a core network of the satellite network, a parameter list that includes at least an estimate of a location of the wireless device and an estimate of one or more satellite locations, estimating, by the core network, a probability of a mapping of a wireless connection between the wireless device and a base station supporting the satellite network based upon the parameter list, and initiating, by the core network, a procedure to communicate with the wireless device through the base station based on the estimated probability of the mapping of the wireless connection between the wireless device and the base station.

Another embodiment includes a system for managing a connection of a wireless device to a satellite network. For an embodiment, the system includes a core network configured to maintain a parameter list that includes at least an estimate of a location of the wireless device and an estimate of one or more satellite locations, estimate a probability of a mapping of a wireless connection between the wireless device and a base station supporting the satellite network based upon the parameter list, and initiate a procedure to communicate with the wireless device through the base station based on the estimated probability of the mapping of the wireless connection between the wireless device and the base station.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 3 is a flow chart that includes steps for managing a connection of a wireless device to a satellite network, according to an embodiment.

DETAILED DESCRIPTION

The embodiments described include methods, apparatuses, and systems for managing a connection of a wireless device to a satellite network. For an embodiment a core network of the satellite network maintains a parameter list that includes at least an estimate of a location of the wireless device and an estimate of one or more satellite locations of satellites of the satellite network. For an embodiment, the core network estimates a probability of a mapping of a wireless connection between the wireless device and a base station supporting the satellite network based on the parameter list. For an embodiment, the core network initiates a procedure to communicate with the wireless device through the base station based on the estimated probability of the mapping of the wireless connection between the wireless device and the base station.

Wireless Device Connectivity to a Satellite Network

Generally, satellite networks maintain exact location information of wireless devices connected to the satellite network because the satellite network maintains a continuous connection to the wireless device. However, satellite networks can have large numbers of wireless devices, and maintaining continuous connection with the wireless device consumes valuable frequency spectrum. At least some of the described embodiments reduce the use of frequency spectrum by maintaining mapping of wireless connectivity between a wireless device and one or more base stations of the satellite network. To initiate a connection to the wireless devices when the wireless devices are not in a connected mode, the satellite network needs to maintain location estimates of the wireless devices. However, this can be particularly difficult because the wireless device can be mobile (moving) and the satellites of the satellite network and beams of the satellites can be highly mobile as well, resulting in satellite coverage areas that are rapidly changing.

Figure 1:
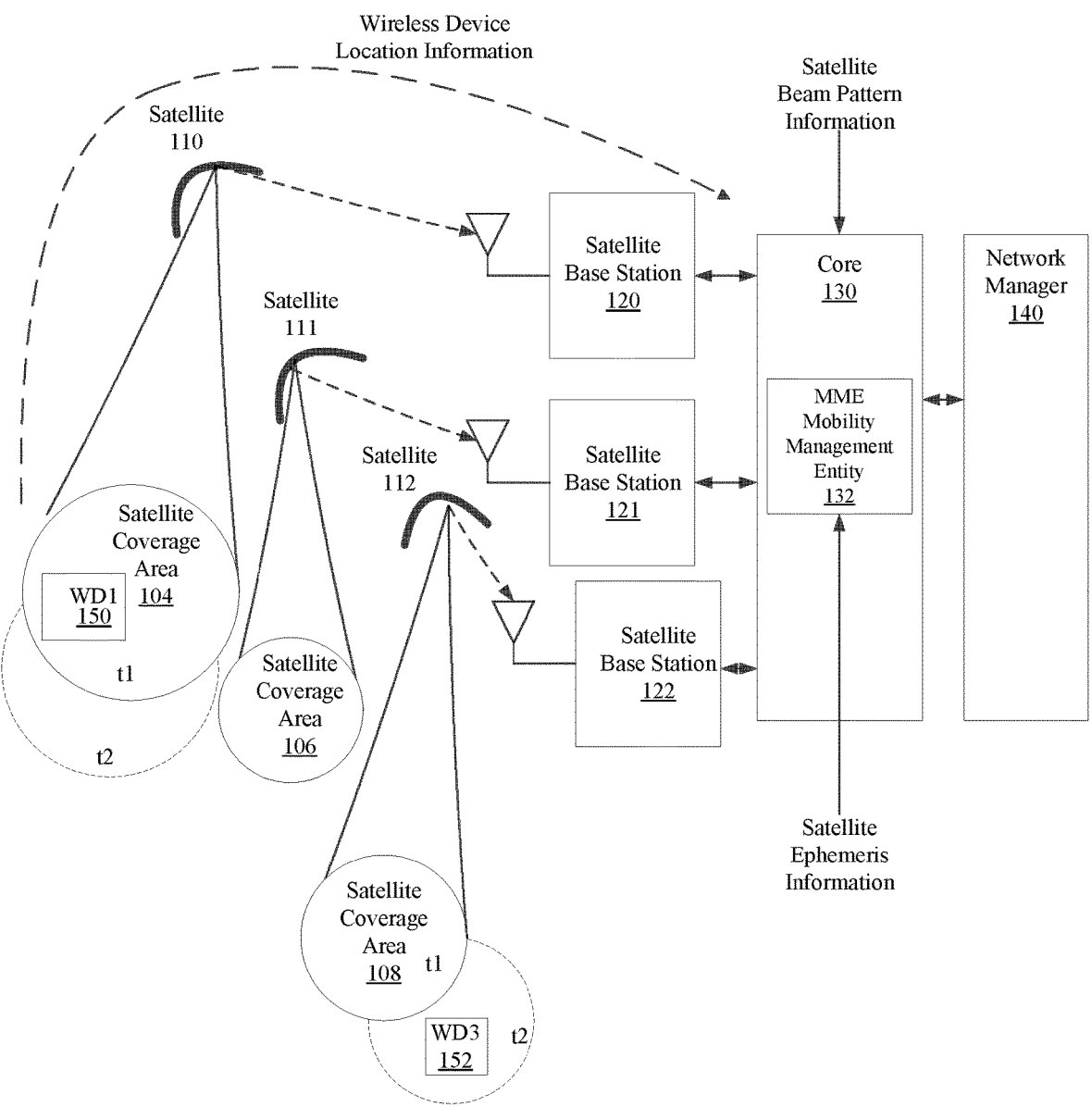
FIG. 1 shows a satellite network that includes a plurality of base stations, wherein mapping is determined between a wireless device and one or more of the plurality of base stations, according to an embodiment.

FIG. 1 shows a satellite network that includes a plurality of base stations, wherein mapping is determined between a wireless device and one or more of the base stations, according to an embodiment. As shown, a plurality of base stations 120, 121, 122 provide wireless satellite network coverage 104, 106, 108 through corresponding satellites 110, 111, 112. For an embodiment, one or more of the satellites 110, 111, 112 have coverage areas that are changing over time. For example, as shown, satellite coverage area 104 changes from time t1 to time t2. Further, for an embodiment, wireless devices 150, 152 that may be connected to the wireless satellite network move as well.

For an embodiment, the base stations 120, 121, 122 are electronically connected to a core network 130 of the satellite network. For an embodiment, the core network 130 is electronically connected to a network manager 140. For an embodiment, the core network 130 includes a MME (mobility management entity) 132.

For at least some embodiments, the core network 130 is configured to maintain a parameter list that includes at least an estimate of the wireless device location and an estimate of one or more satellite locations. For an embodiment, the core network 130 is further configured to estimate a probability of a mapping of a wireless connection between the wireless device and a base station supporting the satellite network based on the parameter list. For an embodiment, the core network 130 is further configured to initiate a procedure to communicate with the wireless device through the base station based on the estimated probability of the mapping of the wireless connection between the wireless device and the base station.

Parameter List

For an embodiment, the parameter list includes the estimate of the location of the wireless device and the estimates of the locations of one or more satellites of the satellite network. The estimate of the location of the wireless device can be based on a non-exhaustive list of parameters including a last known location of the wireless device. Further, each of the parameters can have an associated weighting.

The estimates of the locations of the satellites can include ephemeris data of each of the satellites.

The following is a table that includes exemplary parameters of the parameter list, a description of the parameter, and a confidence is the value of the parameter.

Probability of Mapping

For an embodiment, the probability of mapping includes a mapping between a specific wireless device and each of one or more base stations through one or more of the satellites of the satellite network. The probability mapping includes probabilities of each of the mapped wireless connections between the wireless device and each of the base stations. For an embodiment, the information within the parameter list is used to estimate the probabilities of each of the mapped wireless connections. For an embodiment, estimating the probability of the mapping of the wireless connection between the wireless device and the base station supporting the satellite network includes determining which base stations of the satellite network have coverage of an estimated location of the wireless device, including determining the coverage areas of each of a plurality of base stations based on ephemeris information and beam pattern coverage information of satellites of each of the plurality of base stations of the satellite network.

Initiating a Procedure to Communicate with the Wireless Device

For an embodiment, initiating a procedure to communicate with the wireless device includes a paging mechanism, wherein the base station initiates communication with the wireless device. At least some embodiments include determining, by the core network, a paging mechanism of the procedure to communicate with the wireless device based on the mapping and weightings of parameters in the parameter list. For an embodiment, a mobility management function determines the paging mechanism. For an embodiment, the paging mechanism of the procedure to communicate with the wireless device based on a probability of blockage of the wireless device at the estimated location of the wireless device, wherein the probability of blockage is determined based on an environment, an antenna setup of the wireless device, satellite geometry, and performance history of the wireless device.

Figure 2:
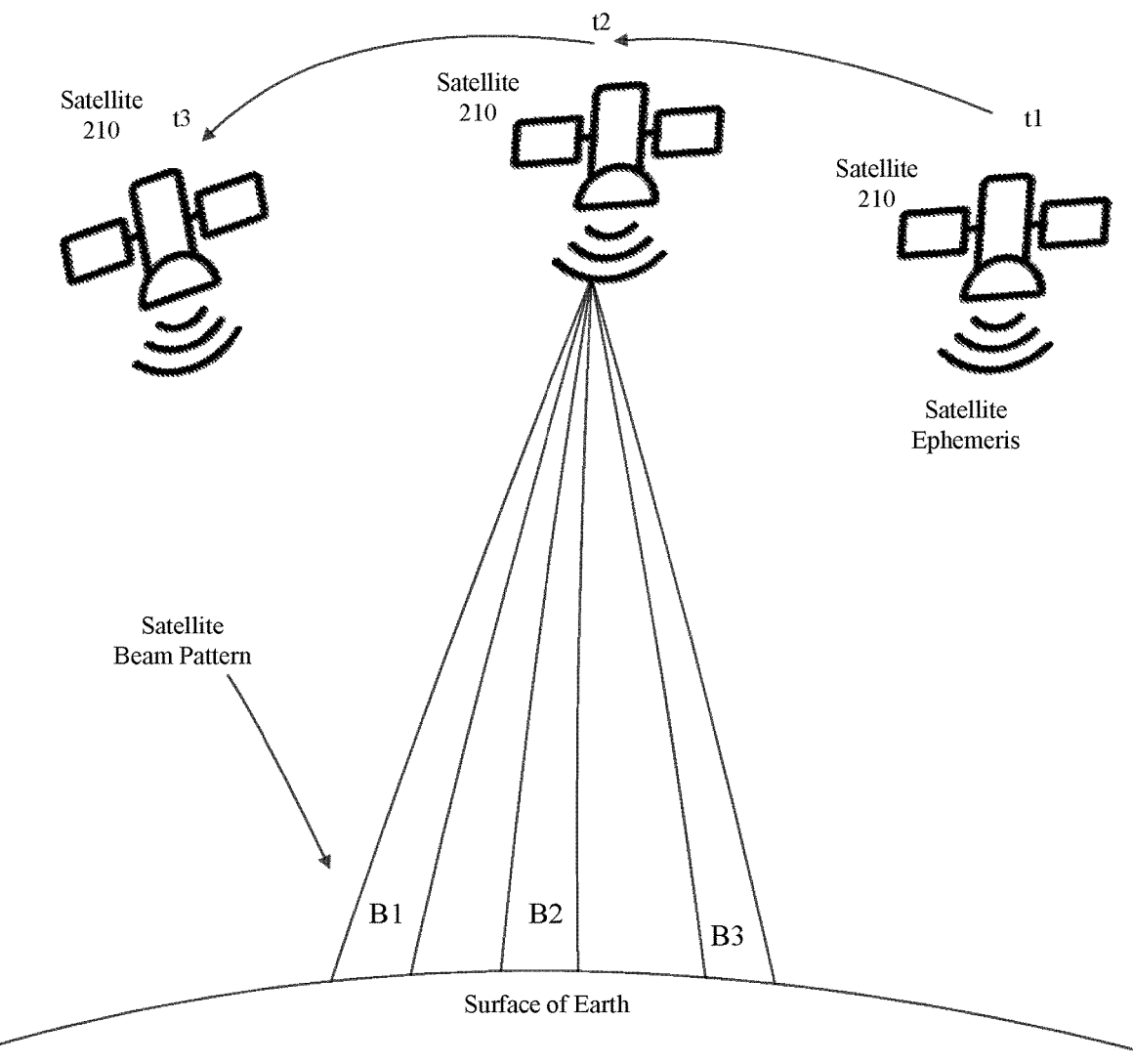
FIG. 2 shows a satellite in motion and beam patterns of the satellite, according to an embodiment.

FIG. 2 shows a satellite 210 in motion and beam patterns of the satellite, according to an embodiment. As shown, the satellite 210 is in motion relative to the surface of the earth. Further, the satellite 210 has a beam pattern including beams B1, B2, B3. Both the position of the satellite 210 and the

| Parameter | Description | Confidence of data of parameters (0 to 1 scale) |
|---|---|---|
| Last known location of Wireless Device | Most recent location of the wireless device | 1 (high) |
| Time Stamp | Recency of know location of wireless device | 1 (high) |
| Velocity/heading of Wireless Device | Recent Wireless Device motion parameters | 0.8 (Low) |
| Beam/cell history of Wireless Device connection | Patterns of previous connections | 0.5 |
| Predicted handover | Expected next beam/cell | |
| Ephemeris data (Location of Satellite) | Satellite position data | |
| Mobility patterns | Historical movement trends | |
| Beam maps (Contours) | Coverage area boundaries | |
| Signal measurements | Contextual signal data | |
| Rx performance of different satellite beams beam/cell history of Wireless Device connection | Eg. Rx Gain, Noise Floor, Satellite antenna performance | 0.5 |
| Tx performance of different satellite beams | Eg. Tx Gain, EIRP, Satellite antenna performance | |
| Tx and Rx Channel Interference | | |
| Registered Region of service | | | beam pattern of the satellite 210 can change with time. For an embodiment, the changing position and beam patterns of the satellite are used in estimating the probability of mapping a wireless connection between the base station and the wireless device.

FIG. 3 is a flow chart that includes steps for managing a connection of a wireless device to a satellite network, according to an embodiment. A first step 310 includes maintaining, by a core network of the satellite network, a parameter list that includes at least an estimate of a location of the wireless device and a location of one or more satellites of the satellite network. A second step 320 includes estimating, by the core network, a probability of a mapping of a wireless connection between the wireless device and a base station supporting the satellite network based on the parameter list. A third step 330 includes initiating, by the core network, a procedure to communicate with the wireless device through the base station based on the estimated probability of the mapping of the wireless connection between the wireless device and the base station through the one or more satellites.

For an embodiment, the initiating by the core network occurs when the wireless device is not in a connected mode or state, and wherein the satellite network does not have current location information of the wireless device or a current mapping between the wireless device and the base station. For an embodiment, the connected mode includes an RRC (radio resource connection) mode. For an embodiment, when in the connected mode the wireless device is actively synchronized with the satellite network and can exchange messages. The network has active (current) knowledge about the current location of the wireless device. For an embodiment, the current location of the wireless devices includes latitude and longitude information reported by the wireless device when in the connected mode. For an embodiment, the wireless device also reports a velocity of the wireless device. Accordingly, for an embodiment, the network can interpolate to determine a new location (current location) based on the location and the velocity (and direction) shared by the wireless device (when it was in connected mode).

For an embodiment, when the wireless device is in the connected mode, the satellite network has information of the exact current location of the wireless device, and the core network of the satellite network also knows which base station the wireless device is currently connected to. However, when not in the connected mode (also referred to as the idle mode or state) the satellite network does not have the exact current location of the wireless device available, and the satellite network performs the probability of a mapping of a wireless connection between the wireless device and a base station supporting the satellite network based on the parameter list.

As will be described, the base station(s) of the satellite network broadcast information that the wireless device can receive when not in the connected mode (idle mode or state). Further, for an embodiment, the wireless device further operates to receive paging information from the base station(s) when not in the connected mode (idle mode or state).

For an embodiment, the parameter list includes at least a last known location of the wireless device and time stamp of the last known location of the wireless device, a velocity and heading of the wireless device and a time stamp of the velocity and heading of the wireless device. Further, for at least some embodiments, the parameters in the parameter list have weights assigned to them. For an embodiment, the weights determine how important each of the parameters are in estimating the probability of mapping of the wireless device and base station. Further, for an embodiment, the weights assigned to each parameter changes dynamically. For an embodiment, the combination of multiple variables or factors used to calculate the weights. For an embodiment, the weighted combinations of the parameters of the network parameter list are adaptively changing and switching based on availability of information and updates received from wireless devices. For an embodiment, the number of parameters in the parameter list adaptively changes based upon the availability of each of the parameters and based on conditions of the wireless device and the satellite network. For an embodiment, the previously described weights change based on a recency of determining the parameter. For an embodiment, depending on the time of receiving a parameter, the confidence level of the data of that parameter changes. For example, a location update from a wireless device 10 minutes ago is more reliable than a location update from the wireless device 1 hour ago, and accordingly, is assigned a greater weight. Again, for an embodiment, the weights assigned to each of the parameters change with an amount of time since the last update of the parameters.

For an embodiment, the parameter list comprises a combination of a last known base station the wireless device was connected to, a receive time of a last message sent by the wireless device. For an embodiment, the wireless device periodically transmits a signaling message which includes a current location of the wireless device, a velocity of the wireless device, and a heading of the wireless device. Further for an embodiment, the signaling message further includes the received signal strength indicator (RSSI), and an estimated propagation delay between the wireless device and different base stations. The satellite network can use the received information from the wireless device signaling message to estimate the location of the wireless device and perform the mapping.

For an embodiment, the parameter list includes ephemeris information of satellites associated with the base station, and a beam map of the satellites associated with the base stations. The information of the satellite(s) associated with the base station is further used by the satellite network in the mapping.

As described, for an embodiment, confidence in the data in the parameter list is influenced by the recency of the data, and a type of the data. For an embodiment, the confidence of each of the parameters influences the weighting of the parameter. For an embodiment based on the parameter list, and the confidences of the parameters (based on recency of data reception), a list of probability metrics are derived which are weighted to estimate the mapping and the procedure to communicate with the wireless device. As described, as the time since the data collection point increases, the confidence of data goes down, and accordingly, a weighting assigned to the parameter of the data point.

As previously described, at least some embodiments further include determining, by the core network of the satellite network, the mapping based on a combination of the data in the parameter list and the associated weightings of the data in the parameter list. As previously described, for at least some embodiments each parameter of the parameter list is adaptively weighted based on at least a recency of the data in the parameter list.

At least some embodiments further include determining, by the core network, a paging mechanism of the procedure to communicate with the wireless device based on the mapping and weightings of parameters in the parameter list.

For an embodiment, a mobility management function determines the paging mechanism. For an embodiment, the paging mechanism of the procedure to communicate with the wireless device based on a probability of blockage of the wireless device at the estimated location of the wireless device, wherein the probability of blockage is determined based on an environment, an antenna setup of the wireless device, satellite geometry, and performance history of the wireless device. For an embodiment, the performance history includes SINR (signal to interference and noise ratio) or RSRP (Reference Signal Received Power) measurements.

As previously described, for an embodiment, the paging mechanism of the procedure to communicate with the wireless device is based on the mapping and weightings of parameters in the parameter list. For an embodiment, the weightings are influenced by a confidence level of an estimated current location of the wireless device, wherein the confidence level is determined based on accuracy and freshness of data from the parameter list including at least the last known location of the wireless device, a timestamp of one or more of the parameters of the parameter list, and beam/cell connection to the satellite network history of the wireless device. For an embodiment, the trajectory and velocity of the wireless device are determined based on current and previous location reports, which are then used to complete the mapping. For an embodiment, a Quality of Service (QOS) class is associated with the wireless device, wherein the QoS class is obtained from a subscriber database in the core network based on the connection establishment. For an embodiment, a device class of the wireless device influences the mapping, wherein the device class is obtained from a device database in the core network.

For an embodiment, the paging mechanism includes one or more possible paging attempts, a number of base stations used to page, and an exponential backoff mechanism for paging. For an embodiment, the exponential backoff mechanism for paging comprises a paging retry time between paging attempts, wherein the paging retry time is adapted based on prevailing network congestion levels, a paging load, and a location confidence of the wireless device. For an embodiment, the exponential backoff is decreased as the confidence in the location of the wireless device increases when satellite network capacity exists. An embodiment includes selecting the number of satellite beams or cells to page the wireless device. For an embodiment, the number of beams and/or cells is dynamically selected based on the location confidence level, uncertainty and trajectory of the wireless device, with less certain locations receiving paging across more beams/cells. An embodiment includes selecting the number of paging attempts to be made for the wireless device. For an embodiment, the number of attempts is adaptively tuned based on a priority or QoS class of the wireless device and the confidence level of the estimated location, with higher priority devices and higher confidence locations receiving more focused paging attempts. For an embodiment, network mobility management function of the core network determines the paging mechanism such that higher confidence location estimates use fewer satellite beams/cells and more focused paging, while lower confidence locations use expanded paging across more beams/cells.

For an embodiment, the network mobility management uses an algorithm based on confidence of wireless device location, blockage probability of wireless device, QoS of the connection, class of wireless device to determine the paging mechanism (number of paging attempts, how many base stations to be used to page, the exponential backoff mechanism for paging). For example, with a high confidence of wireless device location, the satellite network may only page from 1 base station, but if there is a failure (no response to paging), the satellite network may wait for appropriate time and try again with the same base station (since there could be temporary blockage). However, with low confidence of wireless device location, satellite network may page from one or more base stations in the first attempt, and if there is a failure (no response to paging), the satellite network may page using a greater number of base stations rather than using an exponential paging retry mechanism (using more persistent paging from only 1 base station).

For an embodiment, a probability of blockage (that is, a blockage of wireless communication between the wireless device and the base station through a satellite) is used to make decisions on paging mechanisms. For an embodiment, if blockage probability is high, an exponential and persistent paging mechanism is used. For an embodiment, if the blockage probability is high, the network uses multiple base stations for the paging. For an embodiment, if the QoS of the wireless device is high, then aggressive paging is used to ensure the probability of successfully communicating with the wireless device. Aggressive paging includes greater exponential backoff, more persistent paging, and/or more base stations performing the paging.

An embodiment includes determining a location range and a timing duration for the paging mechanism based on the parameters list. For an embodiment, the location range defines or determines start and end locations of the satellites for initiating and terminating downlink communication (paging) for a wireless device. For an embodiment, this determination is based upon the known location of the satellites in the parameter list and the estimated location of the wireless device in the parameter list.

For an embodiment, the timing duration determines the start and stop time for the downlink communications (paging) from one cell of a satellite beam. For an embodiment, the timing thresholds are also defined for the next (neighboring) cell if there is no response from the wireless device when paging from the one (first) cell.

For an embodiment, the timing duration includes start and stop time for communication between satellite network and the wireless device. For an embodiment, the timing duration is defined per cell. For an embodiment, information about the timing duration and the location range are computed by the mobility management entity 132 of the core network 130 of the satellite network. For an embodiment, the core network 130 determines the timing duration and the location range based on the parameter list.

For an embodiment, when the wireless device has an estimated location that is within the coverage area of multiple satellites, then the base station corresponding with the satellite that is determined to have coverage for the longest duration is selected for initiating the paging (initiating the procedure to communicate) with the wireless device. For example, if the coverage duration for one satellite of a first base station is 10 mins and the coverage duration of another satellite of a second base station is 5 mins, then the satellite network selects the first base station for initiating the procedure to communicate including initiating the paging with the wireless device.

For an embodiment, when the wireless device is determined to be moving (changing its location) then the satellite network selects the base station that corresponds with the satellite that has a coverage area moving in the same direction as the movement of the wireless device. The movement of the coverage area of the base station may be used independent of the coverage duration, or in combination.

If there is a failure to reach the wireless device through an initial mapping, an embodiment includes sequentially selecting a next likely mapping and initiating a subsequent communication procedure according to the probability of the mapping. That is, based on the parameters of the parameters list, multiple mappings between the wireless device and multiple base stations can be estimated and ranked. If the highest ranked base station fails to establish communication with the wireless device through the initiated procedure to communicate with the wireless device, then the base station of the second ranked mapping may be used to initiate the procedure to communicate with the wireless device.

For an embodiment, estimating the probability of the mapping of the wireless connection between the wireless device and the base station supporting the satellite network includes determining which base stations of the satellite network have coverage of the estimated location of the wireless device, including determining coverage areas of each of a plurality of base stations based on ephemeris information and beam pattern coverage information of satellites of each of the plurality of base stations of the satellite network. As previously described, for an embodiment the base station with the highest probability of having coverage of the estimated location of the wireless device initiates the procedure to communicate with the wireless device. As described, at least some embodiments include the wireless device receiving the procedure to communicate with multiple satellite beams when the wireless device is in a coverage area of each of the multiple satellite beams.

For an embodiment, when the wireless device is in the connected state, the connected base station sends information about the various frequencies and time (paging opportunities) which the wireless device needs to listen (wirelessly receive) to when the wireless device transitions to being in a not connected mode. The information allows the wireless device to receive paging from multiple satellite beams when in an idle mode (not in the connected mode).

For an embodiment, when multiple base stations are initiating the procedure to communicate with the wireless device through paging, the paging of each of the base stations is selected so that the paging of the different base stations does not overlap in time. Based on the scheduling of the paging of the different base stations, the wireless device hops between the frequency and time allocations of each of the base stations and attempts to receive the paging of each of the base stations. For an embodiment, the scheduling of the paging of the different base stations is performed by the core network of the satellite network.

At least some embodiments include broadcasting, by one or more base stations including the base station determined to have a coverage area that covers the estimate of the location of the wireless device, a location of a center of the coverage area, an effective reception radius, wherein the effective radius is a radius from the center of the coverage area that the wireless device can maintain the wireless connection with the base station. Further, the wireless device calculates a distance from the wireless device to the center of the coverage area indicated by the base station based on the location of the wireless device and the location of the center of the coverage area. For an embodiment, when the calculated distance is greater than the effective reception radius the wireless device initiates a cell reselection procedure. For an embodiment, the wireless device receives the effective reception radius when the wireless device is in a connected mode, and the wireless device compares the calculated distance with the effective reception radius when the wireless device is in the idle mode (wireless device is not in the connected mode). For an embodiment, the wireless device reselects a new cell when the calculated distance is greater than the effective reception radius.

At least some embodiments include broadcasting, by one or more base stations including the base station determined to have a coverage area that covers the estimate of the location of the wireless device, an effective coverage distance, wherein the effective coverage distance is the maximum distance between the satellite and a wireless device for which an effective wireless communication link can be maintained. The wireless device calculates a distance from the wireless device to a satellite of the determined base station based on a location of the wireless device and ephemeris information of the satellite. When the calculated distance is greater than the effective coverage distance, the wireless device initiates a cell reselection procedure. For an embodiment, the wireless device receives the effective coverage distance when the wireless device is in a connected mode. The wireless device compares the calculated distance with the effective coverage distance when the wireless device is in the idle mode and reselects a cell (wherein a cell is defined by a beam of a satellite) when the calculated distance is greater than the effective coverage distance respectively.

For an embodiment, the base station broadcasts an effective reception radius to all wireless devices it is serving (able to wirelessly connect to). For an embodiment, the wireless device calculates its distance to the satellite associated with the base station based on its location and the ephemeris information of the satellite and compares it against the broadcast effective reception radius. If the distance between the location of the wireless device and the satellite is greater than the broadcast effective reception radius, then the wireless device can initiate a cell reselection procedure. Other decisions can alternatively or additionally be made by the wireless device. For an embodiment, the wireless device receives the effective reception radius while the wireless device is in the connected mode and uses the effective reception radius when determining cell reselection in the idle mode or not in the connected mode.

For at least some embodiments, the wireless device can make further decisions based on the effective reception radius. Other decisions can include performing cell reselection to a neighboring cell 1, performing cell reselection to a neighboring cell 2, or staying in the current cell. Other embodiments can include uplink power control mechanism, such as, decreasing the power of the uplink communication if moving to the new cell, and the calculated distance is smaller. Further, for at least some embodiments, wireless device wake up and sleep timings (power saving parameters) can be adapted based on the effective reception radius.

For an embodiment, the wireless device determines which satellite beam to select for performing cell reselection based at least on a carrier frequency band and channel frequency for each of a plurality of satellite beams, and a distance from the wireless device to the coverage area center and effective reception radius of each of the plurality of beams, or a distance of the wireless device from the effective coverage distance of each of the plurality of beams. For an embodiment, antenna characteristics of the wireless device is also used to influence the cell reselection. The antenna of the wireless device will naturally receive and transmit some frequencies better than others. The frequency characteristics of the antenna can be used to influence the cell reselection.

At least some embodiments further include broadcasting, by each base station in the satellite network, information, wherein the broadcast information includes a receiver performance indicator of the base station, and a network transmit performance indicator. For an embodiment, the receiver performance indicator includes a receiver sensitivity for a frequency at the base station, and a satellite G/T (gain to noise temperature). For an embodiment, the network transmit performance indicator includes at least a power level (EIRP (equivalent isotropic radiated power)) that base station/cell is broadcasting at. For an embodiment, the network parameter list includes the receiver performance indicator of the base station, and the network transmit performance indicator. At least some embodiments further include the core network using the receiver performance indicator of the base station, and the network transmit performance indicator to make decisions about initiating procedures to communicate with the wireless device. For an embodiment, the wireless device uses the receiver performance indicator of the base station and network transmit performance indicator to estimate the pathloss between the wireless device and the base station which can be used make decisions about cell reselection.

The Satellite Antenna gain-to-noise-temperature (G/T) is a figure of merit in the characterization of antenna performance, where G is the antenna gain in decibels at the receive frequency, and T is the equivalent noise temperature of the receiving system in kelvins. The path loss, or path attenuation, is the reduction in power density of an electromagnetic wave as it propagates through space. Path loss is a major component in the analysis and design of the link budget of a telecommunication system. The EIRP (Effective Isotropic Radiated Power) is a calculation used to estimate the radiated output power of an isotropic antenna. The receiver sensitivity is the minimum power level at which the receiving node is able to clearly receive the bits being transmitted.

For an embodiment, the wireless device further determines which satellite beam to select for performing cell reselection based on the velocity of the wireless device. For an embodiment, the wireless device considers its velocity and direction while making decisions about cell reselection. The velocity and direction, along with the other broadcast parameters from the satellite network are considered while making cell reselection decisions to ensure there is not a frequent cell reselection, and avoids a ping pong behavior, wherein the ping pong behavior includes the wireless device sequentially reselecting back and forth between two different cells. The ping pong behavior occurs when the wireless device moves (reselects) from one cell to another cell repeatedly in a short period of time. This interrupts connectivity and is a huge overhead on the spectrum usage.

For an embodiment, the wireless device selects a target satellite beam or cell for cell reselection based on determining a target satellite beam or a cell that is suitable for the wireless device's current carrier frequency preferences, location of wireless device and satellite. For an embodiment, a suitable beam is the beam which increases the chances of successful data transmission and prevents adverse effects like the ping pong behavior. Generally, the wireless device will have better antenna characteristics for a fixed range of carrier frequencies which can be accounted for as well while making cell reselection decisions.

At least some embodiments further include the core network updating a beam, satellite, a cell, and location information for the wireless device in the maintained parameter list. For an embodiment, this includes a beam identifier, a satellite identifier, and a cell identifier.

For an embodiment, the previously described beam pattern is a graphical representation of how a radiating system of antennas distributes its energy in different directions in space. The beam pattern provides information about the strength or intensity of the emitted signal as a function of direction relative to the source. The beam pattern shows how the antenna radiates energy in different directions. This pattern can be plotted in various ways, such as in polar coordinates or Cartesian coordinates, depending on the type of radiation and the desired representation. The beam patterns are crucial for understanding the coverage area and performance of the radiating system.

For an embodiment, a beam contour refers to the pattern of signal strength or power distribution on the Earth's surface produced by a communication satellite's antenna. Communication satellites use these beam contours to define the geographic areas where their signals are strongest and where they intend to provide coverage for various services, such as television broadcasting, internet connectivity, or mobile communication.

For an embodiment, satellite beams are often designed to cover specific regions or countries, and they can vary in size, shape, and orientation based on the satellite's orbital parameters, the type of service it aims to provide, and the technical capabilities of its onboard antennas.

At least some embodiments include estimating, by the core network, a probability of mapping of base station to the estimated wireless device location based on estimated current location of the wireless device and overlaying multiple beams including beam identifiers and beam locations.

For at least some embodiments, instead of dividing the geographical area into cells (that define a coverage area of a beam), multiple cascading hexagonal prisms in space can be defined which are associated with a tracking area. For an embodiment, a plurality of base stations (including the base station) each having a tracking area of a hexagonal prism when the tracking area of the beam moves. The tracking area and hexagonal prism can be determined by the core network based on the ephemeris information of each satellite forming the beams.

At least some embodiments include receiving, by the core network, representations of received signal power from the wireless device, and estimating, by the core network, a current location of the wireless device further based on comparisons between the received signal power and beam gain information of a beam of the base station determined to cover the estimated current location of the wireless device.

For an embodiment, the base station receives uplink quality information (wireless link from the wireless device to the base station through an associated satellite) from the wireless device uplink. Further, for an embodiment, the satellite network maintains information about which satellite beam was used to send the uplink information and where the satellite beam was (using satellite ephemeris and beam design information) to form an estimate of the device location. Further, for an embodiment, the wireless device location is further identified by overlaying multiple <beam ID, Beam location> data pairs. Further, for an embodiment, the wireless device reports a received SINR which satellite network compares that with beam gain information to further enhance identification of the wireless device location. For example, if the SINR of a wireless signal received by the wireless device is high, then it may be assumed that the wireless device is at the center of the beam, and if the SINR is low, it may be assumed that the wireless device is located at the edge of the beam.

Figure 4:
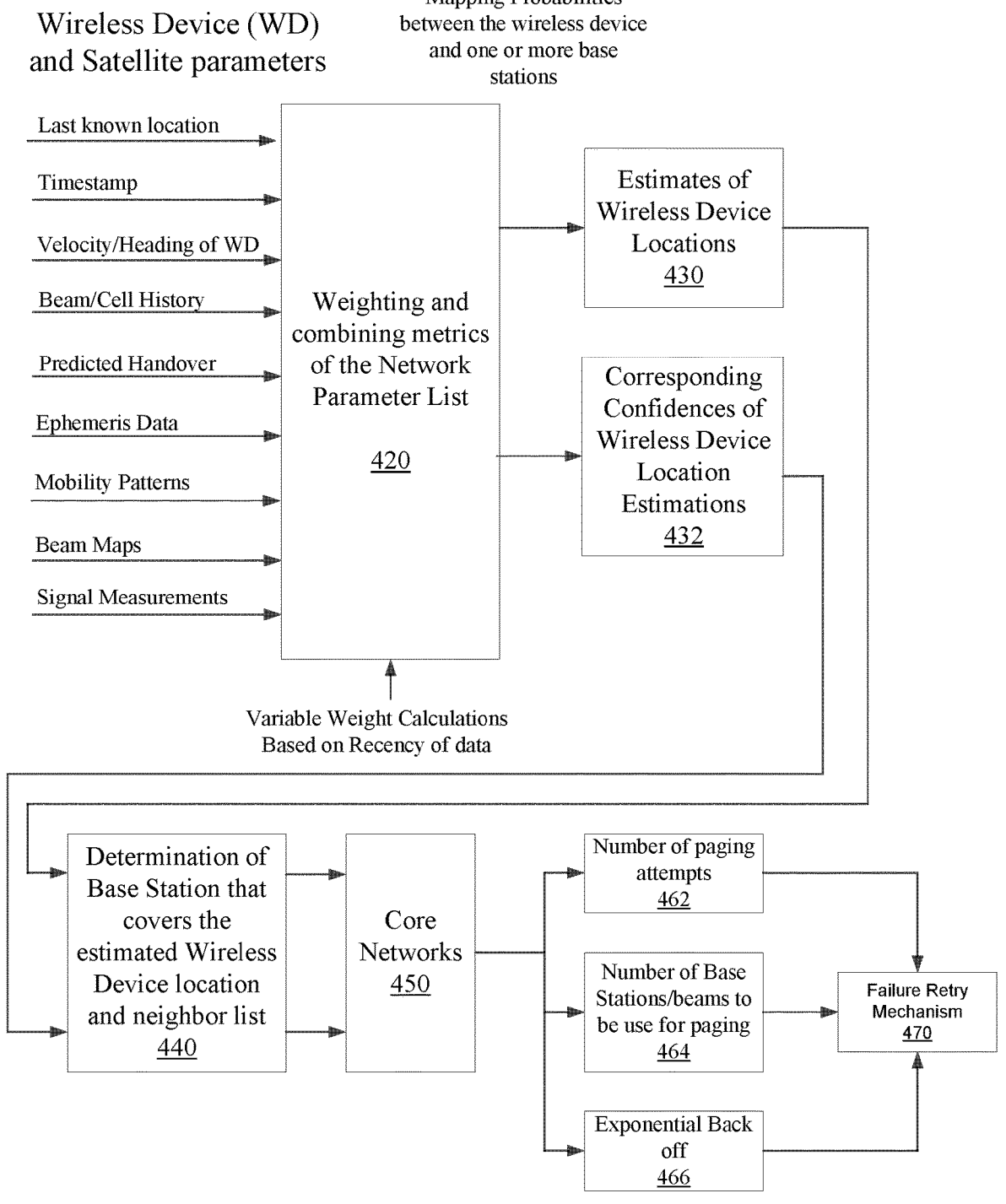
FIG. 4 shows exemplary parameters of a parameter list that are used to generate estimates of locations of a wireless device and corresponding confidences in the estimated locations which are then used to determine (map) which base station has a wireless coverage area that includes the wireless device, according to an embodiment.

FIG. 4 shows exemplary parameters of a parameter list that are used to estimate a location of a wireless device and a confidence in the estimated location which are then used to determine (map) which base station has a wireless coverage area that includes the wireless device, according to an embodiment. For an embodiment, the parameters of the parameters list that are available are weighted based on the importance (likelihood of predicting the location of the wireless device) of the parameter and a recency of the parameter. As shown, a functional block 420 receives each of the parameters that are available, and receives corresponding weighting of each of the parameters. As described, for an embodiment, the weighting is influenced by the probability the parameter provides an accurate indication of where the wireless device is located, and a recency in which the parameter was determined.

For an embodiment, the combining of the parameters and corresponding weights yields 430 estimates of the locations of the wireless device, and 432 corresponding levels of confidences in the estimate of the location of the wireless device. Further, for an embodiment, a determination of the coverage area of the base station is determined, and it is determined whether the coverage area includes the location of the wireless device 440. This includes estimating the probability of mapping of a possible wireless connection between the wireless device and a base station supporting the satellite network based on the parameter list.

Further, based on the probability of the mapping of the wireless connection between the wireless device and the base station through the one or more satellites, the core network 450 initiates a procedure to communicate with the wireless device through the base station based on the estimated probability of mapping. For an embodiment, the initiating the procedure to communicate includes controlling 462 a number of paging attempts of the base station, 464 a number of base stations (each having one or more beams) to be used for the paging, and/or 466 an exponential back off of the paging.

A failure retry mechanism 470 is performed when the wireless device does not respond to any of the paging procedures. For an embodiment, the failure retry mechanism 470 includes paging from additional (different) base stations when no response is received from initial paging attempts. For an embodiment, this may include a new list of base stations that come from a new mapping which is computed (mapped) by the core network after incorporating the failure indications in the initial attempt. For an embodiment, the paging failure retry mechanism 470 also includes selecting an exponential back off of the paging if needed (based on blocking probability).

Figure 5:
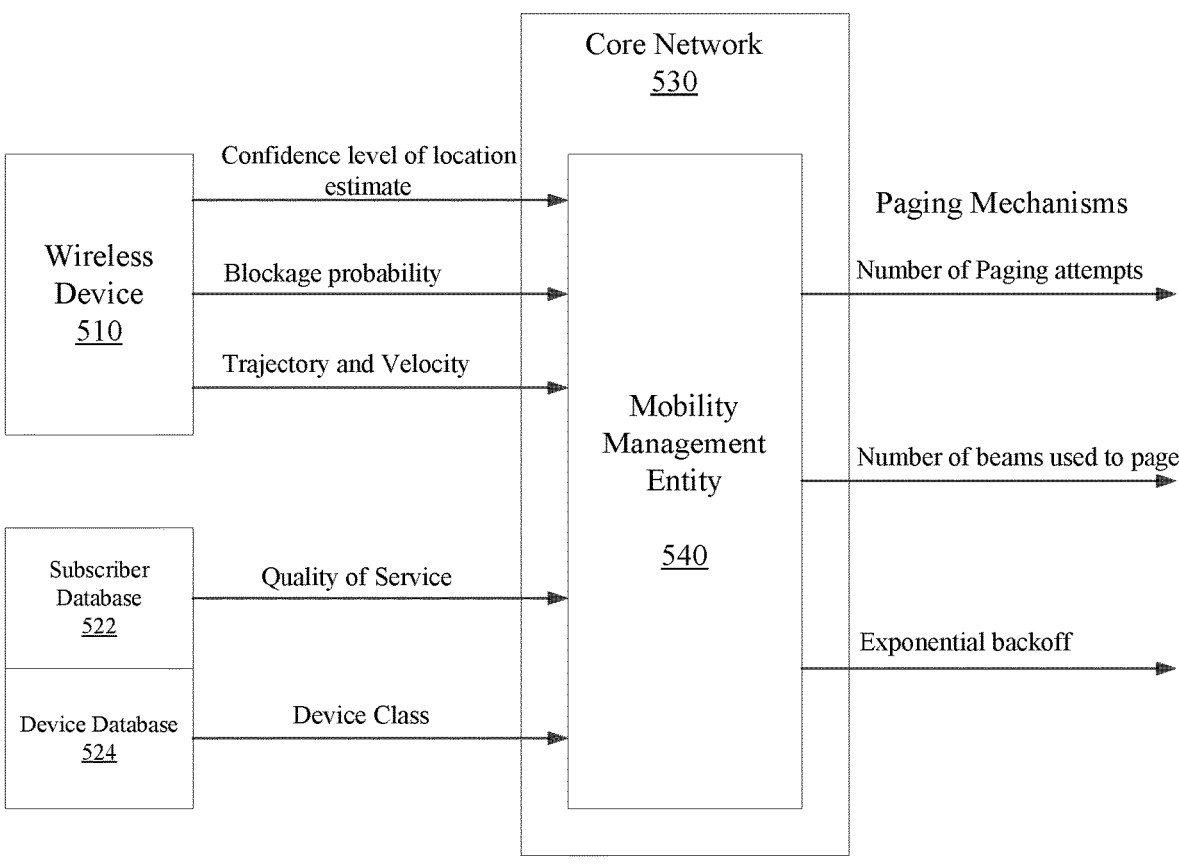
FIG. 5 shows a core network generating paging mechanisms for a wireless device based on parameters of the wireless device and other network parameters, according to an embodiment.

FIG. 5 shows a core network generating paging mechanisms for a wireless device based on parameters of the wireless device and other network parameters, according to an embodiment. As shown, for an embodiment, a core network 530 of the satellite network includes a mobility management entity (MME) 540 that receives from the wireless device 510, for example, a location estimate of the wireless device 510 along with a level of confidence in the location estimate, a probability of blockage (in which blockage indicates whether the wireless link between the wireless device 510 and the base station is blocked), and a trajectory and velocity of the wireless device. Further, for an embodiment, the MME 540 further receives a QoS (quality of service) of the wireless device 510 from a subscriber database 522. Further, for an embodiment, the MME 540 receives a class device of the wireless device 510 from a device database 524.

For an embodiment, based on the indicated inputs (which can include those provided and others) the MME 540 initiates the procedure to communicate with the wireless device. This may include a number of paging attempts, a number of beans to be used to page, and/or an exponential backoff. For an embodiment, the exponential backoff includes exponentially incrementing a backoff interval between consecutive pages. For an embodiment, the exponential backoff uses the negative feedback or failure of response to the paging attempt to multiplicatively decrease the rate of paging.

FIG. 5 shows some additional parameters which can be used to make paging mechanism decisions by the mobility management entity of the core network. For an embodiment, along with the parameters shown in FIG. 4, the core network also obtains information about the blockage probability, the trajectory and velocity of the particular wireless device, a quality of service (QOS) and device class information about the wireless device, allowing the mobility management entity to determine the paging mechanism based on these informational inputs.

Figure 6:
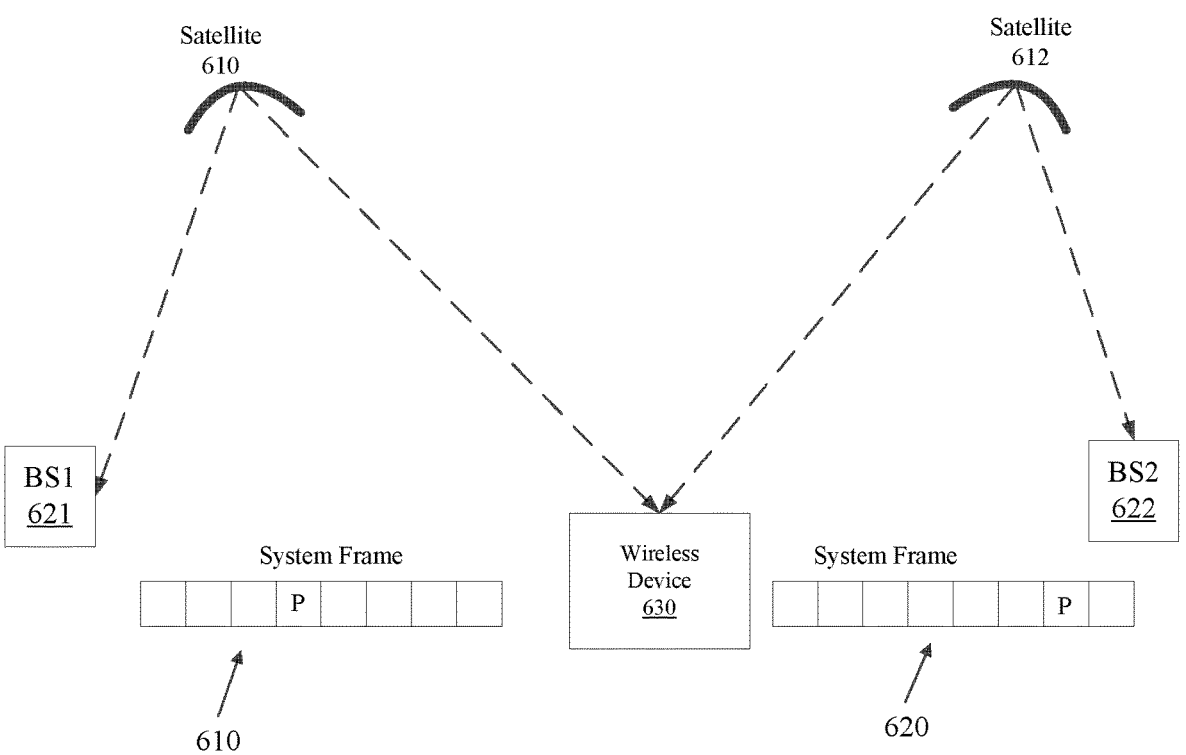
FIG. 6 shows a wireless device located within coverage areas of multiple base stations and synchronization of frames of each of the multiple base stations, according to an embodiment.

FIG. 6 shows a wireless device 630 located within coverage areas of multiple base stations 621, 622 and synchronization of frames 610, 620 of each of the multiple base stations 621, 622, according to an embodiment. As previously described, for an embodiment, the procedure to communicate with wireless device 630 includes sending paging signals from multiple base stations 621, 622.

As previously described, for an embodiment, when multiple base stations are initiating the procedure to communicate with the wireless device through paging, the paging of each of the base stations is selected so that the paging of the different base stations does not overlap in time. Based on the scheduling of the paging of the different base stations, the wireless device can hop between the frequency and time allocations of each of the base stations and attempt to receive the paging of each of the base stations. For an embodiment, the scheduling of the paging of the different base stations is performed by the core network of the satellite network. The frames 610, 620 indicate scheduled broadcasting of the paging by the different base station 621, 622 in which the paging of the base station 621 as depicted by the system frame 610 is timed different than the paging of the base station 622 as depicted by the system frame 620.

Figure 7:
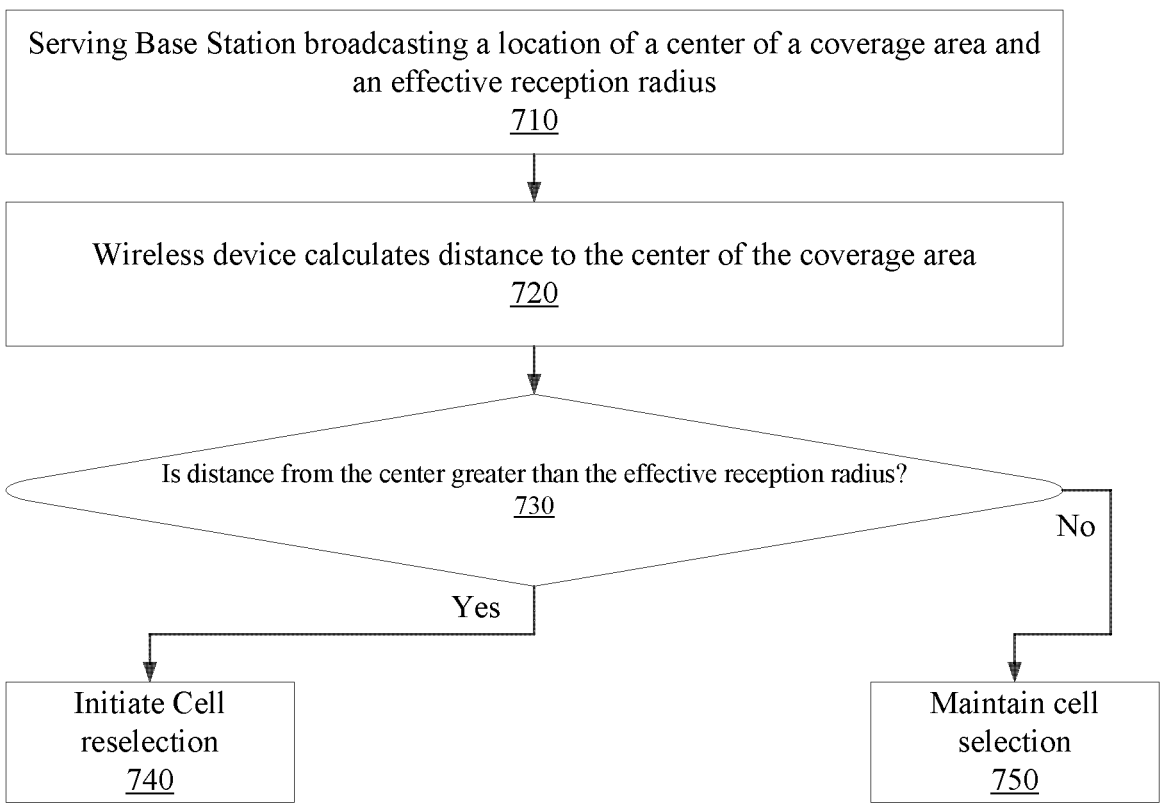
FIG. 7 shows steps of a method of a wireless device initiating a cell reselection, according to an embodiment.

FIG. 7 shows steps of a method of a wireless device initiating a cell reselection, according to an embodiment. A first step 710 includes a serving base station broadcasting a location of a center of a coverage area and an effective reception radius. A second step 720 includes the wireless device calculating a distance to the center of the coverage area. A third step 730 included determining whether the distance from the center of the coverage area is greater than the effective reception radius. If yes, a fourth step 740 includes the wireless device initiating a cell reselection. If not, a fifth step 750 includes the wireless device maintaining its cell selection.

Figure 8:
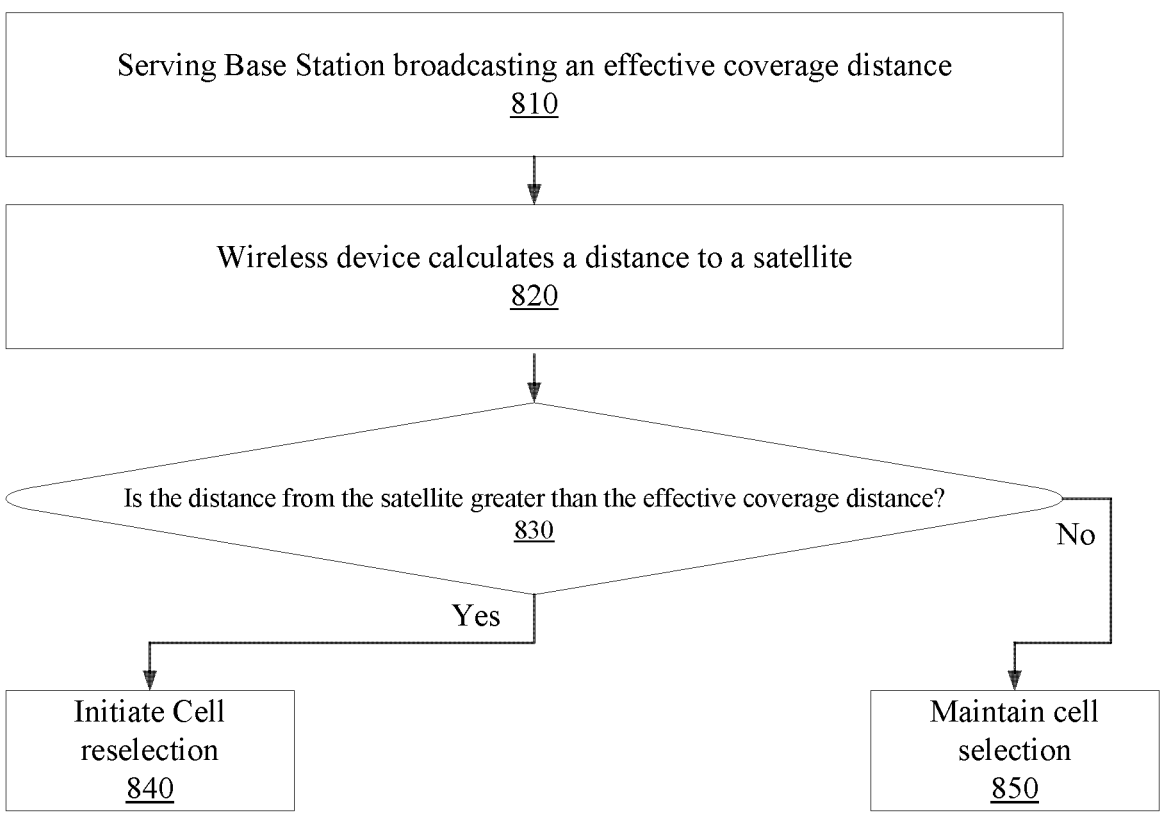
FIG. 8 shows steps of a method of a wireless device initiating a cell reselection, according to another embodiment.

FIG. 8 shows steps of a method of a wireless device initiating a cell reselection, according to another embodiment. A first step 810 includes a serving base station broadcasting an effective coverage distance, wherein the effective coverage distance is a distance in which a wireless device can properly receive wireless signals from a satellite of the serving base station. Properly receiving can be determined, for example, by a received signal strength of wireless signals at the wireless device. A second step 820 includes the wireless device calculating a distance to a satellite associated with the base station. A third step 830 includes determining whether the distance from the satellite is greater than the effective coverage distance. If yes, a fourth step 840 includes the wireless device initiating a cell reselection. If not, a fifth step 850 includes the wireless device maintaining its cell selection.

Figure 9:
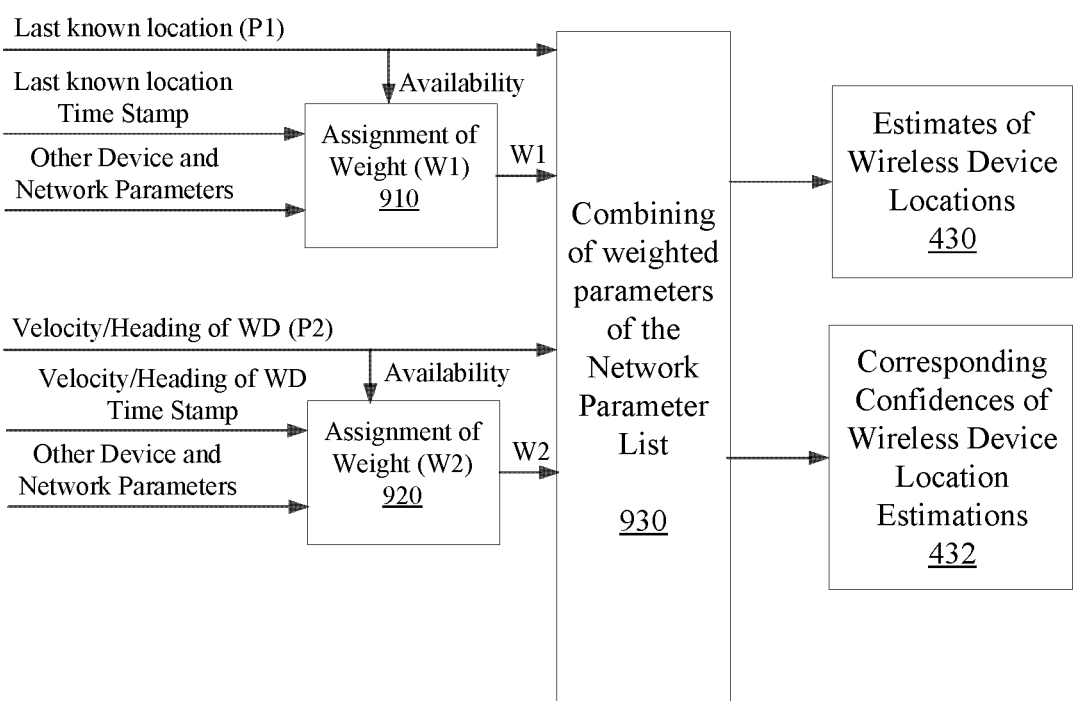
FIG. 9 shows exemplary parameters of a parameter list and corresponding weights that are used to estimate the location of a wireless device and a confidence in the estimated location, according to an embodiment.

FIG. 9 shows exemplary parameters of a parameter list and corresponding weights that are used to estimate the location of a wireless device and a confidence in the estimated location, according to an embodiment. As shown, two possible parameters P1 (last known location of the wireless device), P2 (Velocity/heading of the wireless device) are combined 930 to estimate the location of the wireless device, and to estimate a level of confidence in the estimation of the location of the wireless device.

As previously described, each of the parameters P1, P2 have an associated weighting. For an embodiment, a weight W1 of the first parameter P1 can be assigned 910 based on the availability of the parameter P1, a time stamp of the parameter P1, and/or wireless device and network conditions. For an embodiment, a weight W2 of the second parameter P2 can be assigned 920 based on the availability of the parameter P2, a time stamp of the parameter P2, and/or wireless device and network conditions.

Although specific embodiments have been described and illustrated, the embodiments are not to be limited to the specific forms or arrangements of parts so described and illustrated. The described embodiments are to only be limited by the claims.

What is claimed:

1. A method of managing a connection of a wireless device to a satellite network, comprising:

maintaining, by a core network of the satellite network, a parameter list that includes at least an estimate of a location of the wireless device and a location of one or more satellites of the satellite network;

estimating, by the core network, a probability of a mapping of a wireless connection between the wireless device and a base station supporting the satellite network based on the parameter list; and initiating, by the core network, a procedure to communicate with the wireless device through the base station based on the estimated probability of the mapping of the wireless connection between the wireless device and the base station through the one or more satellites;

determining, by the core network, a paging mechanism of the procedure to communicate with the wireless device is based on a probability of blockage of the wireless device at the estimated location of the wireless device;

wherein the paging mechanism includes one or more of a number of paging attempts, a number of base stations used to page, and an exponential backoff mechanism for paging; and wherein the exponential backoff mechanism for paging comprises a paging retry time between paging attempts, wherein the paging retry time is adapted based on prevailing network congestion levels, a paging load, and a location confidence of the wireless device.

2. The method of claim 1, wherein the initiating by the core network occurs when the wireless device is not in a connected mode, and wherein the satellite network does not have current location information of the wireless device or a current mapping between the wireless device and the base station.

3. The method of claim 1, wherein the parameter list comprises a last known location of the wireless device and time stamp of the last known location of the wireless device, a velocity and heading of the wireless device and a time stamp of the velocity and heading of the wireless device.

4. The method of claim 1, wherein the parameter list comprises ephemeris information of satellites associated with the base station, and a beam map of the satellites associated with the base stations.

5. The method of claim 1, wherein the parameter list comprises a combination of a last known base station the wireless device was connected to, a receive time of a last message sent by the wireless device.

6. The method of claim 1, wherein a confidence of the data in the parameter list is influenced by the recency of the data, and a type of the data.

7. The method of claim 1, further comprising determining, by the core network of the satellite network, the mapping based on a combination of the data in the parameter list and the associated weightings of the data in the parameter list.

8. The method of claim 7, wherein each parameter of the parameter list is adaptively weighted based on at least a recency of the data in the parameter list.

9. The method of claim 1, further comprising determining, by the core network, a paging mechanism of the procedure to communicate with the wireless device based on the mapping and weightings of parameters in the parameter list.

10. The method of claim 1, wherein the probability of blockage is determined based on an environment, an antenna setup of the wireless device, satellite geometry, and performance history of the wireless device.

11. The method of claim 1, further comprising: determining a location range and a timing duration for paging mechanisms based on the parameters list, wherein the location duration includes start and end locations of the one or more satellites for initiating and terminating paging for the wireless device, and the time duration includes start and stop times for paging from a cell formed by a satellite beam of one or more satellites.

12. The method of claim 1, wherein if there is a failure to reach the wireless device through an initial mapping, further comprising sequentially selecting a next likely mapping and initiating a subsequent communication procedure according to a probability of the mapping.

13. The method of claim 1, wherein estimating the probability of the mapping of the wireless connection between the wireless device and the base station supporting the satellite network includes determining which base stations of the satellite network have coverage of the estimated location of the wireless device, comprising determining coverage areas of each of a plurality of base stations based on ephemeris information and beam pattern coverage information of satellites of each of the plurality of base stations of the satellite network.

14. The method of claim 13, further comprising the wireless device receiving the procedure to communicate with multiple satellite beams when the wireless device is in a coverage area of each of the multiple satellite beams.

15. The method of claim 1, further comprising: broadcasting, by one or more base stations including the base station determined to have a coverage area that covers the estimate of the location of the wireless device, a location of a center of the coverage area, an effective reception radius, wherein the effective radius is a radius from the center of the coverage area that the wireless device can maintain the wireless connection with the base station; and calculating, by the wireless device, a distance from the wireless device to the center of the coverage area indicated by the base station based on a location of the wireless device and location of the center of the coverage area;

wherein when the calculated distance is greater than the effective reception radius the wireless device initiates a cell reselection procedure.

16. The method of claim 15, further comprising: receiving, by the wireless device, the effective reception radius when the wireless device is in a connected mode;

wherein the wireless device compares the calculated distance with the effective reception radius when the wireless device is not in the connected mode; and reselecting, by the wireless device, a new cell when the calculated distance is greater than the effective reception radius.

17. The method of claim 1, further comprising: broadcasting, by one or more base stations including the base station determined to have a coverage area that covers the estimate of the location of the wireless device, an effective coverage distance, wherein the effective coverage distance is the maximum distance between the satellite and a wireless device for which an effective wireless communication link can be maintained;

and calculating, by the wireless device, a distance from the wireless device to a satellite of the determined base station based on a location of the wireless device and ephemeris information of the satellite; wherein when the calculated distance is greater than the effective coverage distance the wireless device initiates a cell reselection procedure.

18. The method of claim 17, further comprising: receiving, by the wireless device, the effective coverage distance when the wireless device is in a connected mode; wherein the wireless device compares the calculated distance with the effective coverage distance when the wireless device is in the idle mode; and reselecting a cell when the calculated distance is greater than the effective coverage distance respectively.

19. The method of claim 1, wherein the wireless device determines which satellite beam to select for performing cell reselection based at least on: a carrier frequency band and channel frequency for each of a plurality of satellite beams; and a distance of the wireless device to the coverage area center and effective reception radius of each of the plurality of beams, or a distance of the wireless device from the effective coverage distance of each of the plurality of beams.

20. The method of claim 1, further comprising: broadcasting, by each base station in the satellite network, information, wherein the broadcast information comprises a receiver performance indicator of the base station, and a network transmit performance indicator; wherein the receiver performance indicator includes a receiver sensitivity for a frequency at the base station, and a satellite G/T (gain to noise temperature); and wherein the network transmit performance indicator includes at least a power level that base station is broadcasting at.

21. The method of claim 20, wherein the network parameter list includes the receiver performance indicator of the base station, and the network transmit performance indicator, and further comprising the core network using the receiver performance indicator of the base station, and the network transmit performance indicator to make decisions about initiating procedures to communicate with the wireless device.

22. The method of claim 19, wherein the wireless device further makes a determination of which satellite beam to select for performing cell reselection based on the velocity of the wireless device.

23. The method of claim 1, further comprising the core network updating a beam, satellite, a cell, and location information for the wireless device in the maintained parameter list.

24. The method of claim 1, further comprising: estimating, by the core network, a probability of mapping of base station to the estimated wireless device location based on estimated current location of the wireless device and overlaying multiple beams including beam identifiers and beam locations.

25. The method of claim 1, further comprising: receiving, by the core network, representations of received signal power from the wireless device; and estimating, by the core network, a current location of the wireless device further based on comparisons between the received signal power and beam gain information of a beam of the base station determined to cover the estimated current location of the wireless device.

26. A system for managing a connection of a wireless device to a satellite network, comprising:

the wireless device;

a core network, the core network configured to:

maintain a parameter list that includes at least an estimate of a location of the wireless device and a location of one or more satellites of the satellite network;

estimate a probability of a mapping of a wireless connection between the wireless device and a base station supporting the satellite network based on the parameter list; and initiate a procedure to communicate with the wireless device through the base station based on the estimated probability of the mapping of the wireless connection between the wireless device and the base station through the one or more satellites; and determining, by the core network, a paging mechanism of the procedure to communicate with the wireless device is based on a probability of blockage of the wireless device at the estimated location of the wireless device;

wherein the paging mechanism includes one or more of a number of paging attempts, a number of base stations used to page, and an exponential backoff mechanism for paging; and wherein the exponential backoff mechanism for paging comprises a paging retry time between paging attempts, wherein the paging retry time is adapted based on prevailing network congestion levels, a paging load, and a location confidence of the wireless device.

* * * * *